US 10,563,663 B2

(12) United States Patent
Garceau et al.

(10) Patent No.: US 10,563,663 B2
(45) Date of Patent: Feb. 18, 2020

(54) NITROGEN PURGE OF COMPRESSOR DRY SEAL

(71) Applicant: Solar Turbines Incorporated, San Diego, CA (US)

(72) Inventors: Sean Garceau, San Diego, CA (US); Rainer Kurz, San Diego, CA (US); Donghui Zhang, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 144 days.

(21) Appl. No.: 15/946,902

(22) Filed: Apr. 6, 2018

(65) Prior Publication Data

US 2019/0309765 A1    Oct. 10, 2019

(51) Int. Cl.
| | |
|---|---|
| *F01D 11/06* | (2006.01) |
| *F04D 29/058* | (2006.01) |
| *F04D 29/16* | (2006.01) |
| *F16J 15/34* | (2006.01) |

(52) U.S. Cl.
CPC ............ *F04D 29/161* (2013.01); *F01D 11/06* (2013.01); *F04D 29/058* (2013.01); *F16J 15/3464* (2013.01)

(58) Field of Classification Search
CPC .... F01D 11/096; F04D 29/058; F04D 29/161; F16J 15/3464
See application file for complete search history.

(56) References Cited

U.S. PATENT DOCUMENTS

| | | | | |
|---|---|---|---|---|
| 3,584,973 | A * | 6/1971 | Lambiris | ................. F01D 11/06 417/13 |
| 6,325,382 | B1 | 12/2001 | Iwamoto et al. | |
| 6,345,954 | B1 * | 2/2002 | Al-Himyary | ......... F04D 29/122 277/318 |
| 6,524,059 | B1 * | 2/2003 | Nogiwa | .................. F01D 11/04 415/112 |
| 6,802,689 | B2 * | 10/2004 | Nogiwa | .............. F04D 27/0292 415/112 |
| 8,596,954 | B2 | 12/2013 | Gupta et al. | |
| 9,239,061 | B2 | 1/2016 | Kitano et al. | |
| 9,790,952 | B2 * | 10/2017 | Shamseldin | .......... F04D 29/124 |
| 2001/0017445 | A1 | 8/2001 | Hall et al. | |
| 2013/0106062 | A1 | 5/2013 | Hori et al. | |
| 2013/0129471 | A1 | 5/2013 | Gupta et al. | |
| 2013/0136629 | A1 | 5/2013 | Maier | |

(Continued)

*Primary Examiner* — Igor Kershteyn
(74) *Attorney, Agent, or Firm* — Procopio, Cory, Hargreaves & Savitch LLP (57) ABSTRACT

Systems and method for operating a gas compressor are disclosed herein. A compressor can have one or more dry gas seals surrounding the central axle of the compressor. The dry gas seals can each be pressurized with a barrier gas or other fluid supply providing a barrier within the dry gas seal. The method can include controlling delivery of a first barrier gas to the one or more dry seals during a startup or initiation of the compressor. The method can include controlling delivery of a second barrier gas different from the first barrier gas to the one or more dry seals based on the information received from sensors disposed within the compressor that can measure, inter alia, dry seal temperature and pressure within the system. The method can further include terminating the delivery of the first barrier gas based on the sensor information.

20 Claims, 4 Drawing Sheets

(56) References Cited

U.S. PATENT DOCUMENTS

2014/0161587 A1 6/2014 Shamseldin et al.
2014/0321972 A1 10/2014 Del Vescovo et al.
2015/0118018 A1 4/2015 Baldassarre et al.

* cited by examiner

NITROGEN PURGE OF COMPRESSOR DRY SEAL

BACKGROUND

Technological Field

The present disclosure generally pertains to gas compressor components. More particularly, this disclosure relates to pressurization of certain dry seals with various gases prior to normal operation of a powered gas compressor.

Related Art

Gas compressors exist in various forms and can have separated drive and compressor sections coupled by a drive shaft. Some related examples include, integrated hydroelectric generators, wind turbines with hub generators, etc. For pressurized devices such as compressors, several seals can be used to seal the shaft and various compressor stages from each other and from the atmosphere. Magnetic bearings or hydrodynamic bearings may support moving machinery without physical contact. For example, they can levitate a rotating shaft, providing for rotation with very low friction and no mechanical wear. However in order to provide compression of a working fluid (e.g., air or other gaseous compounds) multiple seals may be needed between compressor stages and between the compressor and the atmosphere. Such seals can be low friction mechanical seals with a tortuous path from inlet to outlet to prevent leakages. These seals can be dry gas seals that implement one or more sealing fluids, or a labyrinth seal and function so that they do not contaminate a process.

U.S. Pat. No. 9,239,031 to Kitano describes a sealing system that is equipped with a dry gas seal having a rotating ring positioned between a casing and a rotor shaft and around the circumference of the rotor shaft, and stationary rings provided on the casing with elastic members interposed therebetween and so as to be capable of contacting the orthogonal edge surfaces of the rotating ring that are substantially orthogonal to the rotor shaft; a sealing gas channel having one end connected to a discharge channel, the other end connected so as to connect to a space between the casing and the outer perimeter surface of the rotating ring in the dry gas seal, and having a sealing gas regulating valve provided therein; and a drain gas channel having one end connected so as to connect to the space via a through hole formed in the casing below the rotating ring, and the other end connected to an intake channel.

U.S. Pat. No. 6,325,382 to Iwamoto, describes a static pressure non-contact type mechanical seal that exhibits and maintains a high sealing function or performance for a prolonged period even when sealing gases containing foreign matter such as oil. A labyrinth seal comprising a plurality of annular grooves and annular plates extending into the grooves is provided, the labyrinth seal partitioning a region on the outside diameter side of the seal faces in the seal case from the inside a region of a gas treatment machine. The seal case is provided with a return passage communicating with the bottom portions of the annular grooves and opening into the inside region A of the machine. The seal case also includes a purge gas feed passage for supplying purge gas to a region C on the outside diameter side of the seal faces, the purge gas pressure being higher than that in the inside region.

U.S. Pat. No. 8,596,954 to Gupta describes a compressor having a shaft seal assembly and system that allows a high-pressure compressor to settle-out at a lower pressure level during shutdown. The seal assembly may be disposed about a portion of the shaft and define a blow-down seal chamber, the seal assembly including one or more gas seals in fluid communication with the blow-down seal chamber. A blow-down line is communicably coupled to the blow-down seal chamber to reference the blow-down seal chamber to a low pressure reference, such as a separate centrifugal compressor, or the like. Referencing the blow-down seal chamber to the low pressure reference reduces the required sealing pressure of the one or more gas seals. A valve may be disposed in the blow-down line and configured to regulate a flow of process gas leakage through the blow-down line.

U.S. Patent Application Pub. No. 2014/0321972 to Vescovo describes systems and methods for assuring a safe working condition of a dry gas seal when a pump/compressor in a standstill condition. A small booster compressor is added to boost the pressure of an intermediate buffer gas injected into the chamber between a primary seal and a secondary seal of the dry gas seal. Control components detect when the barrier gas pressure drops below a preconfigured value and when detected, close a valve in a line to a flare safe area and turns on the compressor. The boosted intermediate buffer gas, nitrogen or dry air, slows the flow of untreated process gas through the primary seal of the dry gas seal and prevents icing of the primary seal.

U.S. Patent Application Pub. No. US2015118018A1 to Baldassare, describes a seal gas delivery system for an end seal on a turbo machine rotor shaft includes a seal gas passageway for delivering a seal gas to the end seal and a seal gas distributor for receiving at least a portion of the seal gas from the seal gas passageway, the seal gas distributor having a plurality of holes for distributing the seal gas about the rotor shaft during turbo machine standstill. The holes are located on a cylindrical surface and are typically arranged all-around said rotor shaft, preferably regularly all-around said rotor shaft.

SUMMARY

In general, this disclosure describes systems and methods related to using various gases, such as nitrogen to pressurize dry gas seals (dry seals) prior to and during normal operation. Dry seals can be used in harsh working environments, where the working fluid is hazardous or to prevent contamination of the compressed gas. Contamination of compressor dry seals can be caused by particles or liquid in the supply of working fluid. When the compressor is not rotating, heat generated by the seal faces (e.g., of the dry seal) is not present. In some examples, liquid may fall out of solution or condense as the working fluid, or gas, decompresses across the compressor face without the addition heat from the seals. Thus, there is a need for a clean, liquid free, source to purge and supply to the dry seals until the compressor rotates and generates sufficient heat to ensure the integrity of the dry seal.

The systems, methods and devices of this disclosure each have several innovative aspects, no single one of which is solely responsible for the desirable attributes disclosed herein.

One aspect of the disclosure provides a method for operating a gas compressor having one or more dry seals. The method can include controlling, by a controller, delivery of a first barrier gas to the one or more dry seals. The method can include initiating, by the controller, operation of the compressor to produce a compressed process gas. The method can include receiving, at the controller, sensor information from one or more sensors disposed within the compressor for a period of compressor operation, the sensor information including a temperature of the one or more dry seals. The method can include controlling, by the controller, delivery of a second barrier gas different from the first barrier gas to the one or more dry seals, the delivery of the second barrier gas being based on the sensor information. The method can include terminating the delivery of the first barrier gas based on the sensor information.

Another aspect of the disclosure provides a system for delivering barrier gas to one or more dry seals of a compressor operable to output a compressed process gas. The system can have a first barrier gas supply device configured to provide a first barrier gas to the one or more dry seals. The system can have a second barrier gas supply device configured to provide a second barrier gas different from the first barrier gas, to the one or more dry seals. The system can have one or more sensors configured to provide sensor information, the sensor information including a temperature of the one or more dry seals. The system can have a controller communicatively coupled to the first barrier gas supply device, the second barrier gas supply device, and the one or more sensors. The controller can control delivery of the first barrier gas to the one or more dry seals. The controller can control initiation of the compressor to produce the process gas. The controller can receive the sensor information from one or more sensors during operation of the compressor and the one or more dry seals. The controller can control delivery of the second barrier gas in place of the first barrier gas based on the sensor information and a predetermined time.

Another aspect of the disclosure provides a method for operating a gas compressor having one or more dry seals. The method can include pressurizing the one or more dry seals by supplying a startup gas to the one or more dry seals. The method can include initiating operation of the compressor to produce a compressed process gas. The method can include monitoring a temperature of the produced compressed gas and the one or more dry seals. The method can include supplying a primary seal gas to the one or more dry seals, the delivery of the second barrier gas being based, at least in part, on the monitored temperature. The method can include terminating the supplying of the startup gas to the one or more dry seals, based on supplying the primary gas seal.

Other features and advantages of the present disclosure should be apparent from the following description which illustrates, by way of example, aspects of the disclosure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Figure 1:
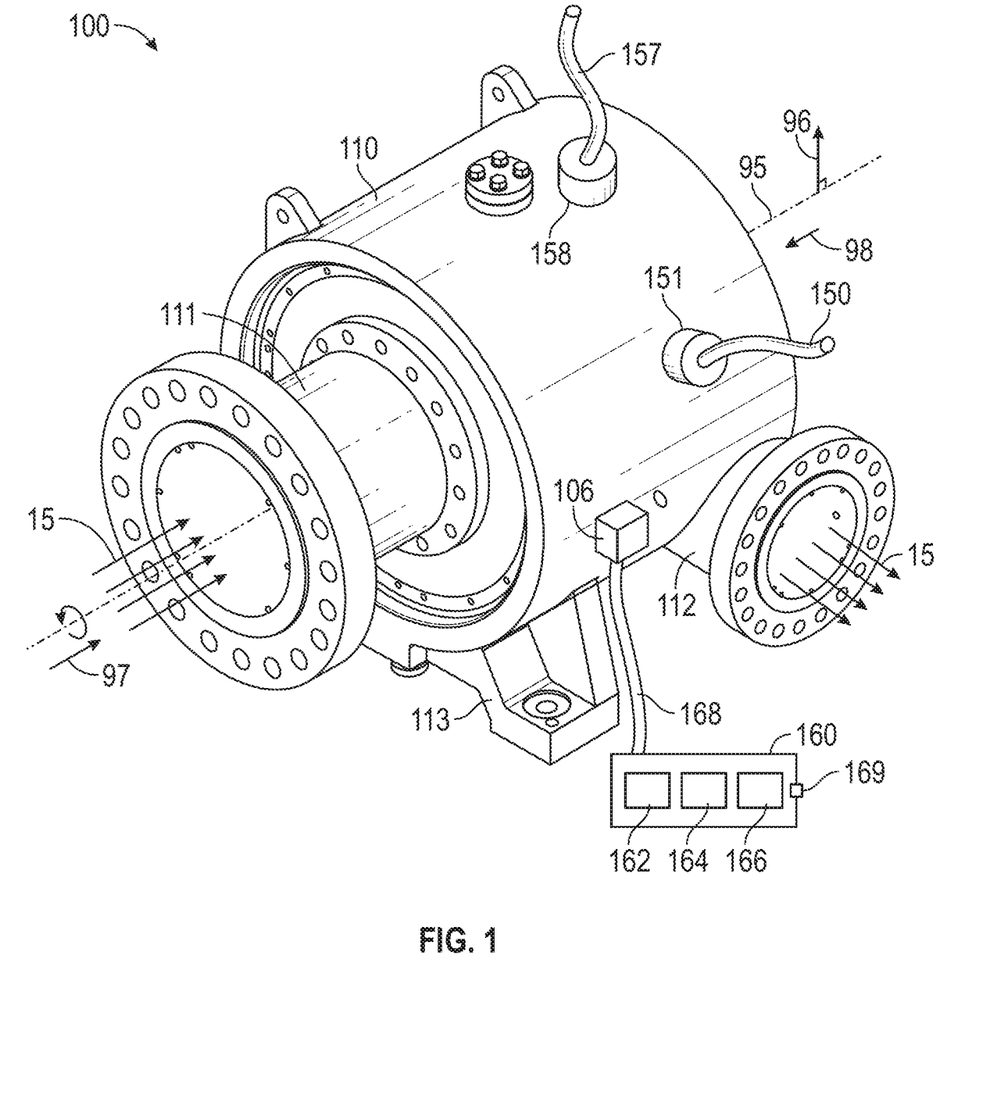
FIG. 1 is a perspective view of an exemplary gas compressor.

FIG. 1 is a perspective view of an exemplary gas compressor. In particular, the illustrated gas compressor 100 is embodied as an axially-fed, industrial centrifugal gas compressor having a side discharge. However, this particular configuration is merely for illustration purposes, as the illustrated gas compressor 100 can include any combination of singular or plural, axial, linear, and radial feeds and discharges. Likewise, the present disclosure may be applied to other types of pumps, compressors, and the like. Here and in other figures, various components and surfaces have been omitted or simplified for clarity purposes and ease of explanation.

For reference, the gas compressor 100 generally includes a center axis 95 about which its primary rotating components rotate. The center axis 95 may be common to or shared with various other components of the gas compressor 100. All references to radial, axial, and circumferential directions and measures refer to center axis 95, unless specified otherwise, and terms such as "inner" and "outer" or "inward" and "outward" generally indicate a lesser or greater radial distance from the center axis 95, wherein a radial 96 may be in any direction perpendicular and radiating outward from center axis 95.

In addition, this disclosure may reference a forward and an aft direction. Generally, all references to "forward" and "aft" are associated with a flow direction, relative to the center axis 95, of the compressed gas. In particular, the suction end 97 (inlet) of the gas compressor 100, relative to the center axis 95 is referred to as the forward end or forward direction. Accordingly, the end opposite the input end may be referred to as discharge end 98. The embodiment shown is a side discharge compressor, however for ease of description, the discharge end 98 is opposite, and/or aft, the suction end 97.

The gas compressor 100 can have a compressor housing 110. The compressor housing 110 can contain the major components of the gas compressor 100. Generally, the compressor housing 110 encloses and supports internal components of the gas compressor 100.

The compressor housing 110 can have a suction port 111 and a discharge port 112. The suction port 111 interfaces with a fluid supply (not shown), and is configured to supply a fluid (e.g. working gas, working fluid, process gas, pumped fluid, etc.) to the gas compressor 100. Here, the fluid is a gas 15. Similarly, the discharge port 112 interfaces with a fluid discharge (not shown), and is configured to discharge the gas 15 from the gas compressor 100. The compressor housing 110 may also include support legs 113, or other features to secure or physically ground the gas compressor 100.

The compressor housing 110 can have multiple external interfaces including communication, power, and fluid supply. The compressor housing 110 can have at least one external interface 106. The external interface 106 can provide electronic communications between various electrical or electronic components with in the compressor housing 110 and external control systems, for example. The external interface 106 can be communicatively coupled to a control system 160. The control system 160 can have can have a controller 162. In particular, the controller 162 can be a computer, a central processing unit (CPU), one or more processors, or microprocessors, coupled to one or more memories 164 which can be nontransitory. The one or more memories 164 can store instructions for the operation of the gas compressor 100 and a variety of subsystems or components. The controller 162 can control the operations of the gas compressor 100. The control system 160 can also have a power supply 166 configured to supply power to the gas compressor 100. The control system 160 is shown external to the housing 110, however in some embodiments the control system 160 may be an integral component of the gas compressor 100.

The control system 160 can have a communication link 168, and an input/output ("I/O") terminal 169. The controller 162 can control various operations the gas compressor 100, including stiffness and damping of the magnetic bearings (e.g., the first bearing 180 and the second bearing 190) and control of fluid supply within the gas compressor 100. For example, the controller 162 can control supply of barrier fluids or barrier gases to one or more dry seals (FIG. 2, FIG. 3) within the gas compressor via the fluid supply lines 150. In some embodiments, the barrier gas can be injected between the dry gas seal and the labyrinth seal. The barrier gas can prevent process gas from leaking into the dry gas seal. The labyrinth seal can prevent process gas from entering the dry gas seal.

Additional controls for the gas compressor 100 may be integrated into the gas compressor 100 and/or located remotely. Moreover, communications, feedback, and control for the gas compressor 100 may be interfaced independently. Alternately, communications, feedback, and control for the gas compressor 100 may be interfaced via communication link 168, the I/O terminal 169, and/or the external interface 106.

The external interface 106 may include power conduit and associated power control devices configured to provide power from an external supply (e.g., the power supply 166) into the gas compressor 100. For example, the external interface 106 may include electrical conduit and accessories conventionally associated with an electrical supply. Alternately, the external power source may be hydraulically or pneumatically based.

Figure 2:
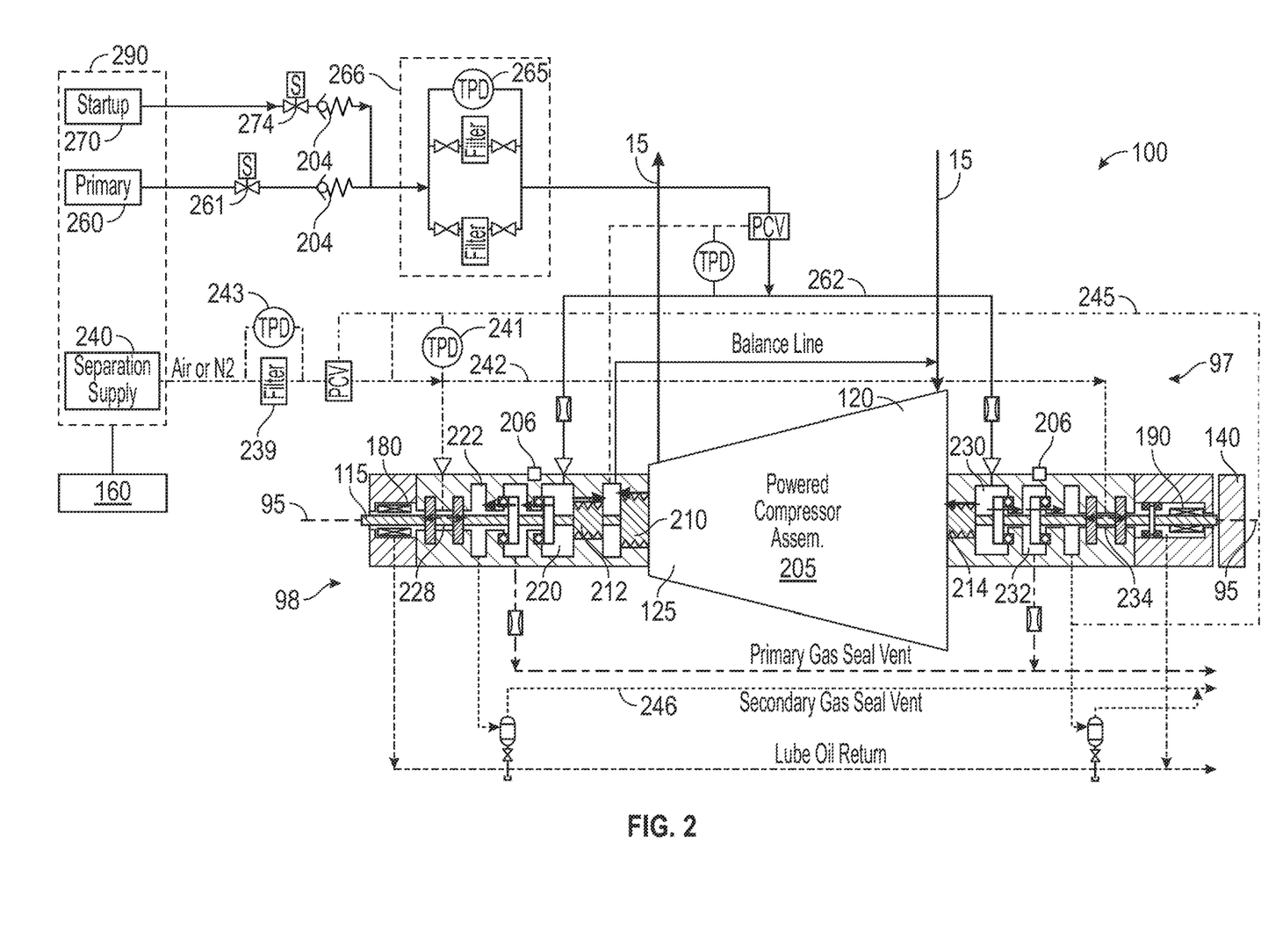
FIG. 2 is a cross sectional view of an embodiment of the gas compressor of FIG. 1 with some elements depicted schematically.
Figure 3:
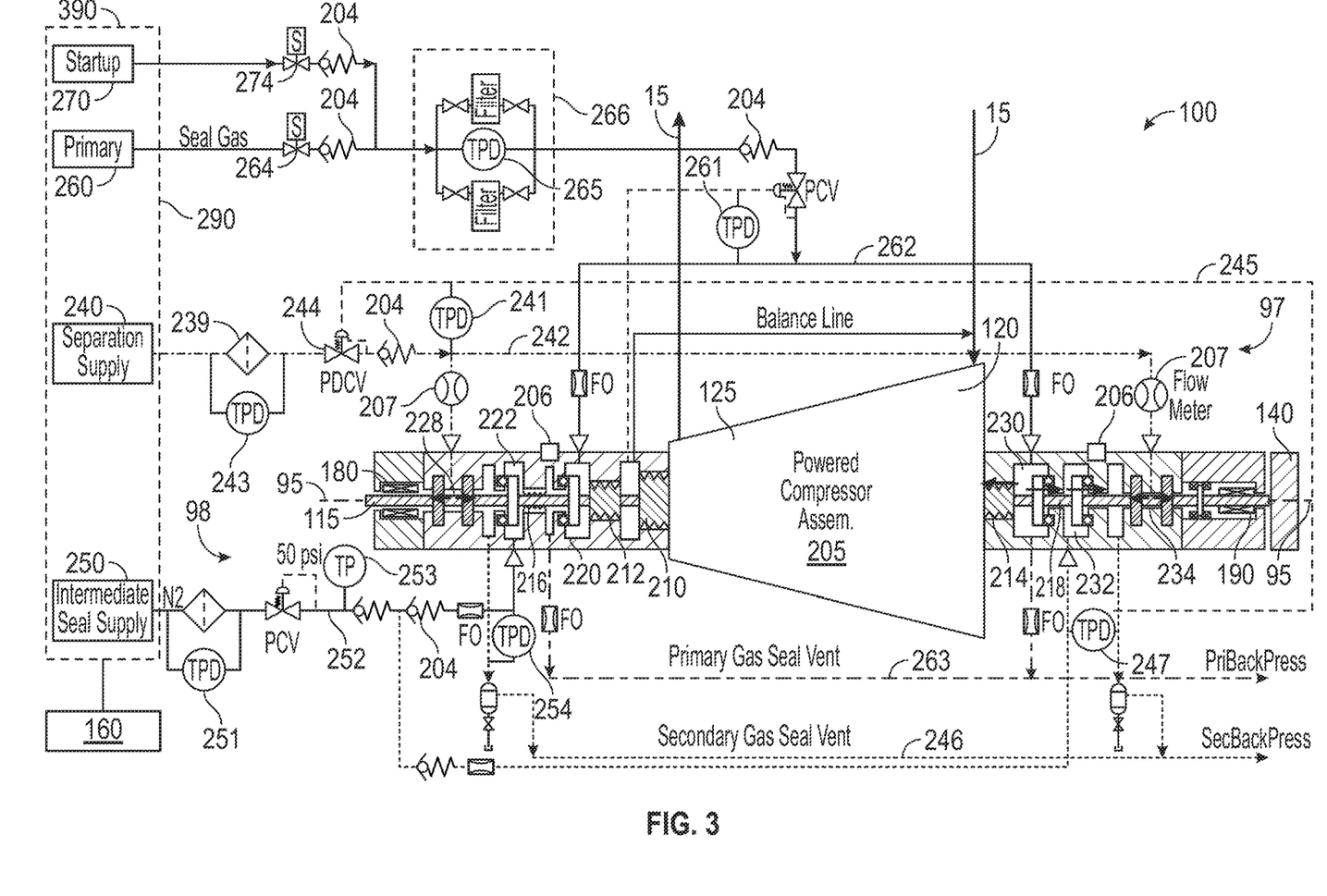
FIG. 3 is a cross sectional view of another embodiment of the internally driven compressor of FIG. 1 with some elements depicted schematically.

The gas compressor 100 can include fluid supply lines 150 for supplying a fluid, such as seal gas or a cooling fluid (e.g., air) to the gas compressor 100. The fluid supply lines 150 can further supply various other gases or fluids to other portions of the gas compressor 100. In some examples, the fluid supply lines 150 can be coupled to one or more supply lines or other conduit, internal to the gas compressor 100. Such internal fluid supply lines can provide fluid to one or more dry seals, for example (FIG. 2, FIG. 3). In an embodiment, the fluid can be a barrier gas, such as a process gas, natural gas, nitrogen, carbon dioxide, and air, to name a few. The fluid supply lines 150 can have a supply connection 151 operable to connect to a fluid supply. In the embodiment illustrated, a fluid outlet line 157 also connects to the housing 110 at the discharge connection 158. The fluid outlet line 157 can comprise one or more vent lines (e.g., the seal gas vent lines described in connection with FIG. 2 and FIG. 3). The fluid supply lines 150 may include various flanges, fittings, and valves for connecting to the fluid supply and for controlling the flow of the barrier gases, coolant, or other working fluid. In addition, while only one supply connection 151 and one discharge connection 158 are shown, multiple of each can be present, as is described in connection with FIG. 2 and FIG. 3, for example. As described in connection with the following figures, the fluid supply lines 150 can be coupled to one or more valves that can be controlled by the controller 162.

FIG. 2 is a cross sectional view of an embodiment of the gas compressor of FIG. 1 with some elements depicted schematically. In the embodiment shown, the gas compressor 100 can have a powered compressor assembly 205 having multiple compressor stages. As above, various components and surfaces may have been left out, cut away, and/or simplified for clarity purposes and ease of description. The gas 15 enters the gas compressor 100 axially at the suction port 111 (see FIG. 1), is compressed in one or more compressor stages within the powered compressor assembly 205, and is subsequently collected and discharged via the discharge port 112 (see FIG. 1).

Internally, an embodiment of the gas compressor 100 includes a central axle 115, a compressor inlet 120, and a compressor outlet 125. The central axle 115 can be supported by one or more bearings, shown as a first bearing 180 and the second bearing 190. The gas compressor 100 can also be coupled to a drive system 140, such as a gas turbine engine or electric motor. The drive system 140 can provide the rotational power to rotate the powered compressor assembly 205 on an axis 95. The drive system 140 and the one or more bearings 180, 190, (forming a compressor bearing system), are configured to drive and support the powered compressor assembly about the center axis 95, respectively. The drive system 140 is shown coupled to the suction end 97 of the gas compressor 100. However, in some embodiments, the drive system 140 can be coupled anywhere along the drive shaft 115. The drive system 140 can also be internal or external to the gas compressor 100.

The powered compressor assembly 205 rides in a cavity within the compressor housing 110. In addition, the drive system 140, and the compressor bearing system may be enclosed within the compressor housing 110 (see FIG. 1).

The compressor inlet 120 includes an upstream opening (e.g., the suction port 111) in the compressor housing 110 configured to introduce the gas 15 into the compressor flow path within the compressor housing 110. The compressor flow path may be bound in part by the compressor housing 110 (or additional structures within the compressor housing 110), and in part by the rotor(s) within the powered compressor assembly 205. The compressor inlet 120 can be configured as an axial inlet; however, in other embodiments the compressor inlet 120 may be configured as a radial or side inlet, similar to that shown in FIG. 1.

The compressor outlet 125 includes a downstream opening (e.g., the discharge port 112 of FIG. 1) in the compressor housing 110 configured to discharge the gas 15 from the compressor housing 110. For example, the downstream opening may be defined by the interface between the compressor housing 110 and the discharge port 112 (FIG. 1). Moreover, the compressor outlet 125 may generally include the discharge port 112 and any upstream flow distributing/shaping features.

In an embodiment, the gas compressor 100 may support the drive system 140 and the compressor bearing system via the central axle 115. Moreover the powered compressor assembly 205 may be rotatably mounted to the central axle 115, such that the powered compressor assembly 205 may rotate about the center axis 95. The central axle 115 is then supported by the compressor housing 110. The central axle 115 may be supported from both its forward and aft ends, for example, by the bearings 180, 190. (e.g., where the gas compressor 100 includes radial feed and discharge, and two endcaps). Also for example and as illustrated, the central axle 115 may include a cylindrical outer diameter.

Generally, the central axle 115 includes a member fixed to the compressor housing 110 at one or more locations. For example, the central axle 115 may include a member concentric with the center axis 95 and fixed to the compressor housing 110 at its aft and/or forward ends. Also for example, the central axle 115 may be solid, hollow, symmetrical, and/or asymmetrical. Accordingly, the central axle 115 may have a cylindrical shape, and be positioned in a location similar to that of a conventional drive shaft. However, unlike a conventional drive shaft, penetrating its respective compressor housing and operating at a high rotation speed, the central axle 115 may reside completely within the compressor housing 110, or at least be substantially sealed within the compressor housing 110.

According to one embodiment, the central axle 115 may be hollow or include hollow portions. In particular, the central axle 115 may include one or more passageways through which power, control, cooling, pressure equalization, etc. may be provided to or within the gas compressor 100. For example, the central axle 115 may have a generally tubular shape.

The powered compressor assembly 205 can be supported by a first bearing 180 and a second bearing 190. The first bearing 180 and the second bearing 190 can be radial bearings. The gas compressor 100 may also include a third radial bearing located between the first bearing 180 and the second bearing 190. The gas compressor 100 may further include a thrust bearing. In the embodiment illustrated, the bearings, including the first bearing 180 and the second bearing 190, are magnetic bearings. Other bearings, such as radial contact bearings, may also be used.

The first bearing 180 and the second bearing 190 can be configured as radial magnetic bearings, operable to magnetically levitate the compressor shaft, e.g., the central axle 115. The compressor bearing system is configured to operate with very low friction and little to no mechanical wear. Additionally, the compressor bearing system can also include auxiliary or backup bearings.

In some embodiments, the gas compressor 100 may also include a dry seal system including one or more seals between the compressor housing 110 and the powered compressor assembly 205. The one or more seals are configured to impede the gas 15 from bypassing or flowing other than through the compressor flow path of the powered compressor assembly 205. For example, the powered compressor assembly 205 may include one or more dry gas seals (e.g., ceramic dry gas seals), separation seals, and labyrinth seals, to name a few. In the embodiments described herein the seals can be described collectively as a compressor dry seal system.

The central axle 115 can pass through multiple of such seals on both the suction end 97 (e.g., the suction port 111 of FIG. 1) and the discharge end 98 (e.g., the discharge port 112 of FIG. 1).

On the discharge end 98, the gas compressor 100 can have a first labyrinth seal 210 and a second seal labyrinth seal 212 adjacent the powered compressor assembly 205. Adjacent to the second labyrinth seal 212, the shaft can pass through a first dry seal 220, a second dry seal 222, and at least one separation seal 228. Additional seals or dry seals can be included as needed. The first dry seal 220 is also referred to herein as a primary dry seal. The second dry seal 222 is also referred to herein as a secondary dry seal.

On the suction end 97, the gas compressor 100 can have a third labyrinth seal 214 adjacent the powered compressor assembly 205. The central axle 115 can pass through a third dry seal 230, a fourth dry seal 232, and at least one separation seal 234.

In some embodiments, the gas compressor 100 can be coupled to a fluid delivery system or a fluid supply system 290. The fluid supply system 290 can have one or more fluid supply devices coupled to fluid supply line 150 (FIG. 1). Each of the fluid supply devices can be a barrier gas supply device for supplying a barrier gas to one or more dry seals (or dry gas seals) of the compressor 100. Each of the fluid supply devices within the fluid supply system 290 can be a pump in combination with one or more reservoirs, for example. Each of the fluid supply devices can be in fluid communication with the fluid supply lines 150. Each of the fluid supply devices can be can be communicatively coupled to the control system 160. The fluid supply system 290 can have a separation gas supply device 240. The separation gas supply device 240 can supply separation gas to the first separation seal 228 and second separation seal 234 via a separation supply line 242. The separation supply line 242 can have one or more filters, at least one differential pressure transmitter (TPD) 241, 243, or at least one flow orifice (FO). Each of the TPDs (e.g., the TPD's 241, 243) can be coupled to the control system 160 via the communication link 168. Each FO can be, for example, located outside the compressor housing 110. The FO's can be used to regulate fluid flow to the dry seal system if the fluid is on the supply side of housing 110. If the FO is locate on the outlet of housing 110, such as the primary seal gas vent 263, the FO's 265 can be used to detect high fluid flow, resulting from a dry seal failure, for example. In some embodiments, the separation gas can be air or nitrogen, for example.

As shown, the TPD 243 can measure, for example, pressure drop across a filter 239. The filter 239 can remove liquid and/or particulate matter from the separation gas provided by the separation gas supply device 240. The separation supply line 242 can also have a pressure differential control valve (PDCV) 244 in fluid communication with a separation seal gas reference pressure line 245. The PDCV 244 can be used to control flow from the separation gas supply device 240 based on a pressure differential with the separation seal gas reference pressure line 245.

Separation gas escaping via the first separation seal 228 and the second separation seal 234 can be collected via a secondary gas seal vent 246 and separation seal gas reference pressure line 245. In addition some of the separation gas may flow past the first separation seal 228 and second separation seal 234 to the external atmosphere. The TPD 241 can further measure pressure differential between the separation supply line 242 and the separation seal gas reference pressure line 245. The controller 162 can use pressure differential information from various locations within the gas compressor 100 to regulate compressor operation and fluid supply.

In some embodiments, the fluid supply system 290 can have a primary seal gas supply device 260. The primary seal gas supply device 260 can be coupled to a primary supply line 262. As shown, the primary supply line 262 can be in fluid communication with the first dry seal 220 and the third dry seal 230 via one or more check valves 204 and a filter assembly 266. The filter assembly 266 can have a TPD 265 and a plurality of filters to filter the primary seal gas. The TPD 265 can provide information related to pressure differential across the filter assembly 266 and can determine which of the plurality of filters is in use. In some examples, the primary seal gas supply device 260 can provide, for example, process gas, natural gas, or other suitable separation gas to the first dry seal 220 the third dry seal 230 during operation of the powered compressor assembly 205.

Contamination of the compressor dry seals can be caused by particles or liquid in the supply. When the compressor is not rotating, heat generated by the seal faces is not present. In some examples, given pressure differentials across the dry seals gases may condense forming liquid at the seal face as the gas decompresses. This can happen, for example, in applications implementing certain process gases, natural gas (e.g., methane), or other gases that contain small amounts of gaseous liquids (or are gaseous liquids themselves), as the seal gas. Liquids present on the face of a dry seal can cause the dry seal to fail.

Following startup of the gas compressor 100, temperature within the dry seals increases, gradually decreasing or eliminating occurrence of liquid dropout across the dry seals due to the pressure differential across the dry seals (e.g., the first dry seal 222, the second dry seal 222, the third dry seal 230, the fourth dry seal 232). Increased temperature and equalized pressure across the dry seals following compressor start up, diminishes contamination issues arising from condensed fluids/liquids. In some examples, dry seals function most efficiently when at an appropriate operating temperature. Condensed liquids that fall out of the seal gas(es) in such a situation can be detrimental to the dry seal, leading to failure of the seal.

However, in the time between startup of the gas compressor 100 and the time the dry seals approach their respective operating temperatures, there is a risk of accumulating condensed liquids within the dry seals (e.g., the first dry seal 222, the second dry seal 222, the third dry seal 230, the fourth dry seal 232). Thus a startup gas, different from the primary seal gas, may be used for a period of time to mitigate the risks of condensation and dry seal failure.

In some embodiments, the fluid delivery system 290 can further have a startup gas supply device 270. The startup gas supply device 270 can supply the startup gas, or first barrier gas to the primary supply line 262 for a period of time during compressor start up. In some embodiments, the startup gas can be nitrogen. Nitrogen is advantageous in this application as it is inert, no liquid will condense from it due to a pressure differential, and it is easily filtered. In some embodiments, the startup gas can be supplied to the dry seals (e.g., the first dry seal 220 and the third dry seal 230) for a predetermined amount of time allowing the dry seals to come up the temperature. In some examples, the predetermined period of time can be approximately 10 minutes. In some embodiments, the amount of time for which the startup gas may be supplied to the dry gas seals can be a function of when the powered compressor assembly 205 is on-load. The on-load condition can be identified via measurement of increased temperature the compressor outlet and rotational speed of the central axle 115.

The primary seal gas supply device 260 can be coupled to the primary supply line 262 via a first control valve 264. Similarly the startup gas supply device 270 can be coupled to the primary supply line 262 via a second control valve 274. Both can be coupled to the check valves 204 and to the filter assembly 266.

The first control valve 264 and the second control valve 274 can be electrically controlled, for example, by a solenoid. The controller 162 can be coupled to both the first control valve 264 and the second control valve 274. This can allow the controller 162 to apply the startup gas to the appropriate dry seals for a period of time during compressor start up. Once the temperature within the compressor indicates peak performance of the dry seals, the controller 162 can cease application of the startup gas from the startup gas supply 270 and apply the primary gas from the primary gas supply 264 normal compressor operations. In some embodiments, the controller 162 gradually increase primary seal gas in the primary supply line 262 via the first control valve 264, while gradually decreasing the use of the startup gas via the second control valve 274. In some embodiments, the gas supply from the second control valve 274 can be maintained until the powered compressor assembly is on-load, at which point the primary gas supply 260 in enabled via the first control valve 264.

In some embodiments, the startup gas can also be implemented to purge the dry seals of the gas compressor 100. Purging the dry seals can include supplying the startup gas to the dry seals for a period of time prior to compressor start up. For example, the startup gas (e.g., nitrogen) can pass across these seals and into the compressor. The primary dry seal and secondary dry seals are the ceramic seals.

The gas compressor 100 can have one or more sensors 206 at various locations throughout the gas compressor 100. For example, sensors 206 can measure temperature within, or in the vicinity of the first dry seal 220 and the second dry seal 222. Sensors 206 can also be placed near the third dry seal 230 and the fourth dry seal 232. Sensors 206 can also measure temperature of the other dry seals, for example the separation seal 228 and the separation seal 234. In some embodiments, other sensors such as flow sensors 207 disposed within one or more of the supply lines can also provide information related to operational conditions of the gas compressor 100. The sensors 206 can be communicatively coupled to the controller 162 via the communication link 168 (see FIG. 1), for example.

In some embodiments, the controller 162 can receive information from one or more sensors 206 disposed within the gas compressor 100 for relay to the controller 162. The sensors 206 can measure one or more operating conditions within the gas compressor 100. In some embodiments, the sensors 206 can measure temperature, pressure or pressure differential, and rotational speed, (to name a few) in addition to the relative changes in each measured operating conditions over time. The controller 162 can also transmit commands to one or more subsystems throughout the integrated machine, such as flow control systems and components, magnetic bearings, or magnetic bearing control systems (e.g., the first bearing 180 and the second bearing 190) to be controlled, flow control devices (e.g., valves) coupled to the fluid supply lines 150.

FIG. 3 is a cross sectional view of another embodiment of the internally driven compressor of FIG. 1 with some elements depicted schematically. In addition to the features described in connection with FIG. 2, in the embodiment shown, the gas compressor 100 can have a first intermediate labyrinth seal 216 disposed between the first dry seal 220 and the second dry seal 222. The gas compressor 100 can further have a second intermediate labyrinth seal 218 disposed between the third dry seal 230 and the fourth dry seal 232.

The gas compressor 100 can have a fluid supply system 390. The fluid supply system 390 can be similar to the fluid supply system 290. The fluid supply system 390 can have an intermediate seal supply device 250. The intermediate seal supply device 250 can supply intermediate seal gas to the second dry seal 222 and the fourth dry seal 232. The immediate seal supply device 250 can be coupled to an intermediate supply line 252. The intermediate supply line 252 can be coupled to a filter assembly having a TPD 251. The TPD 251 can measure a pressure differential (e.g., pressure drop) across the filter, for example. The TPD 251 can also be communicatively coupled to the controller 162. The intermediate supply line 252 can also have a pressure control valve (PCV) that can regulate pressure of the intermediate seal gas to, for example 50 psi. The intermediate supply line 252 can also have at least one pressure transmitter (TP) 253. The TP 253 can be coupled to the control system 160 via the communication link 168. The immediate supply line 252 can also have a TPD 254 configured to measure pressure differential between the pressure within the intermediate supply line 252 and the secondary gas seal vent 246. The TPD 254 can be coupled to the communication link 168. The intermediate seal gas can exit system via the second dry seal 222 and the fourth dry seal 232 and the secondary gas seal vent 246.

Seal gas supplied to the first dry seal 220 and to the third dry seal 230 can be collected in a primary gas seal vent 263. In some embodiments process gas may be used as the seal gas in the primary supply line 262. Accordingly in the events such seal gas is a noxious gas such as hydrogen sulfide, this gas may be vented to the primary gas seal vents and subsequently burned off, for example. The combination of the first dry seal 220 and the intermediate labyrinth seal 216 (in addition to the intermediate seal gas) prevent the noxious gas from venting to the atmosphere or becoming a hazard to surround personnel. Similarly, a combination of the third dry seal 230 and the second intermediate labyrinth seal 218 can provide a similar function.

INDUSTRIAL APPLICABILITY

Gas compressors such as those described herein rely on various dry seals to maintain pressurization as the working fluid is compressed. One such dry seal is the dry gas seal, which relies on the introduction of compressed fluids (e.g., a gas) into the seal space to maintain isolation across the shat 115. A compressor rotor (or other rotating body) can have the dry gas seals such as the first dry seal 220, the second dry seal 222, the third dry seal 230, and the fourth dry seal 232. Labyrinth seals and separation seals can also be implemented as described herein. Certain fluids or gases can contain varying amounts of gaseous components that can condense into liquids when subjected to changing pressure, such as when the gas flows across the dry gas seal. This can cause the dry gas seal to fail. In some examples, the dry gas seals described herein can rely on the heat created by the shaft 115 rotating within the dry gas seal to maintain relatively equal pressure across the seal. During startup, the dry seals in the compressor 100 can be cold, and thus the pressure across the seal can vary greatly. Certain process gases or air can condense as they flow across the seal, dropping liquid onto the seal face causing the seal to fail.

Figure 4:
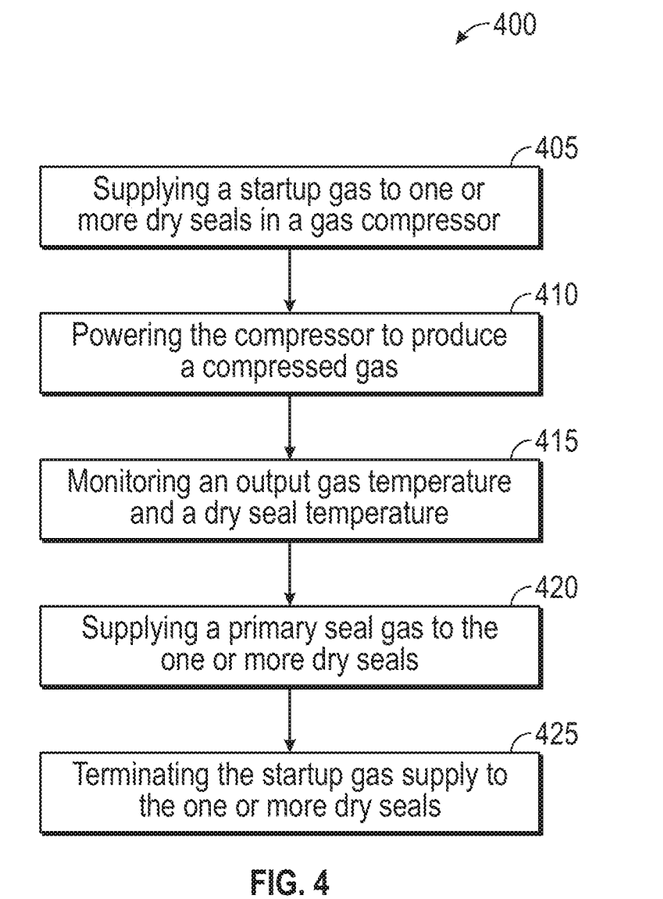
FIG. 4 is a flowchart of an embodiment of a method for supplying seal gas to the dry seals of FIG. 2 and FIG. 3.

FIG. 4 is a flowchart of an embodiment of a method for supplying seal gas to the dry seals of FIG. 2 and FIG. 3. A method 400 can begin at block 405, when the controller 162 command the fluid supply system 290, 390 supply startup gas to one or more dry seals of the internal driven compressor 100. In some embodiments the controller 162 can control the flow of the startup gas and the primary seal gas via the respective control valves 264, 274. The one or more dry seals can be any one of the first dry seal 220, the second dry seal 222, the third dry seal 230, and the fourth dry seal 232. The startup gas can be supplied to other dry seals, the separation seals 228, 234, or other locations within the gas compressor 100. In some embodiments, the startup gas can be an inert gas such as nitrogen. In some embodiments, the startup gas can be used to purge the dry seals prior to start up.

At block 410, power can be applied to the powered compressor assembly 205 by the drive system 140. The gas compressor 100 can then produce compressed gas or process gas, as needed. The fluid supply system 290, 390 can continue to supply (e.g., on command from the controller 162) the startup gas to the one or more dry seals during startup and for a period of time following startup.

At block 415, the controller 162 can receive indications from the sensors 206 positioned throughout the gas compressor 100. The sensors 206 can provide measurements or indications of dry seal temperature, gas supply line pressure, pressure differential from one or more of the various TPD's or TP's, output gas pressure, and output gas temperature among other metrics. The controller 162 can implement certain timing requirements before ceasing the supply of the startup gas from the dry seals.

At block 420, the controller 162 can command the fluid supply system 290, 392 to begin delivering the primary seal gas to one or more dry seals based on the measurements and indications received from the sensors 206. In some embodiments, the controller 162 can gradually increase the amount of primary seal gas supply (via the control valve 264) while decreasing the startup gas supply (via the control valve 274). The transition from startup gas to primary seal gas can be based at least in part on the compressor discharge temperature and rotational speed of the central axle 115, for example. In some embodiments, the controller 162 can command the fluid supply system to begin delivery of the primary seal gas before ceasing delivery of the startup gas. In some embodiments, the startup gas can be ceased at the same time the primary seal gas is initiated.

At block 425, the fluid supply system 290, 390 can command the fluid supply system 290, 390 to terminate the supply of startup gas to the one or more dry seals. In some embodiments, when the controller 162 receives sufficient information (e.g., temperature and pressure information) from the sensors 206, the controller 162 can cease the supply of startup gas to dressings. Sufficient information in this sense can be an indication from the sensors 206 that the temperature of the dry seals is sufficient to provide optimum performance of the dry seals.

In some other embodiments, the controller 162 can command the fluid supply system 290, 390 to supply the startup gas to the dry seals for a predetermined period of time. Such a predetermined period of time can be for example 10 minutes. The predetermined period of time can also be used in conjunction with temperature and pressure information from the sensors 206 to determine the appropriate time to terminate the supply startup gas to dry seals.

Those of skill will appreciate that the various illustrative logical blocks (e.g., the various servers described herein), modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block or step is for ease of description. Specific functions or steps can be moved from one module or block without departing from the disclosure.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

What is claimed is:

1. A method for operating a gas compressor having one or more dry seals, the method comprising:
controlling, by a controller, delivery of a first barrier gas to the one or more dry seals;
initiating, by the controller, operation of the compressor to produce a compressed process gas;
receiving, at the controller, sensor information from one or more sensors disposed within the compressor for a period of compressor operation, the sensor information including a temperature of the one or more dry seals;
controlling, by the controller, delivery of a second barrier gas different from the first barrier gas to the one or more dry seals, the delivery of the second barrier gas being based on the sensor information; and
terminating the delivery of the first barrier gas based on the sensor information.

2. The method of claim 1, wherein the first barrier gas comprises nitrogen.

3. The method of claim 1, wherein the second barrier gas is the compressed process gas.

4. The method of claim 1, wherein controlling the delivery of the first barrier gas comprises controlling a first flow control valve, and controlling the delivery of the second barrier gas comprises controlling a second flow control valve.

5. The method of claim 1, wherein the sensor information further comprises a temperature of the compressed process gas.

6. The method of claim 1, further comprising adjusting, by the controller, the delivery of the first barrier gas based on fluid flow information from one or more flow meters in fluid communication with one of the first barrier gas and the compressed process gas.

7. The method of claim 1, wherein terminating the delivery of the first barrier gas is completed when the period of compressor operation exceeds a predetermined time limit.

8. A system for delivering barrier gas to one or more dry seals of a compressor operable to output a compressed process gas, the system comprising:
a first barrier gas supply device configured to provide a first barrier gas to the one or more dry seals;
a second barrier gas supply device configured to provide a second barrier gas different from the first barrier gas, to the one or more dry seals;
one or more sensors configured to provide sensor information, the sensor information including a temperature of the one or more dry seals; and
a controller communicatively coupled to the first barrier gas supply device, the second barrier gas supply device, and the one or more sensors, the controller configured to,
control delivery of the first barrier gas to the one or more dry seals,
control initiation of the compressor to produce the process gas,
receive the sensor information from one or more sensors during operation of the compressor and the one or more dry seals;
control delivery of the second barrier gas in place of the first barrier gas based on the sensor information and a predetermined time.

9. The system of claim 8, wherein the controller is further configured to command the termination of the delivery of the first barrier gas based on the sensor information.

10. The system of claim 8, wherein the first barrier gas comprises nitrogen.

11. The system of claim 8, wherein the second barrier gas is the compressed process gas.

12. The system of claim 8, wherein the controller is configured to:
control the delivery of the first barrier gas via one or more commands to a first flow control valve in fluid communication with the first barrier gas supply device; and
control the delivery of the second barrier gas via one or more commands a second flow control valve in fluid communication with the second barrier gas supply device.

13. The system of claim 8, wherein the sensor information further comprises a temperature of the compressed process gas.

14. The system of claim 8, wherein the controller is further configured to adjust the delivery of the first barrier gas based on fluid flow information from one or more flow meters in fluid communication with one of the first barrier gas and the compressed process gas.

15. The system of claim 8, wherein terminating the delivery of the first barrier gas is completed when the period of compressor operation exceeds a predetermined time limit.

16. A method for operating a gas compressor having one or more dry seals, the method comprising:
pressurizing the one or more dry seals by supplying a startup gas to the one or more dry seals;
initiating operation of the compressor to produce a compressed process gas;
monitoring a temperature of the produced compressed gas and the one or more dry seals;
supplying a primary seal gas to the one or more dry seals, the delivery of the second barrier gas being based, at least in part, on the monitored temperature; and
terminating the supplying of the startup gas to the one or more dry seals, based on supplying the primary gas seal.

17. The method of claim 16, wherein the startup gas comprises nitrogen.

18. The method of claim 16, wherein the primary gas is the compressed process gas.

19. The method of claim 16, wherein the supplying comprises controlling the delivery of the startup gas via a first flow control valve, and controlling the delivery of the primary gas via a second flow control valve.

20. The method of claim 16, wherein the terminating the supplying of the startup gas to the one or more dry seals is further based a temperature of the compressed process gas.

* * * * *